United States Patent [19]

Mori

[11] Patent Number: 4,726,642
[45] Date of Patent: Feb. 23, 1988

[54] ARTIFICIAL LIGHT SOURCE DEVICE

[76] Inventor: Kei Mori, 3-16-3-501, Kaminoge, Setagaya-ku, Tokyo, Japan

[21] Appl. No.: 658,693

[22] Filed: Oct. 9, 1984

[30] Foreign Application Priority Data

Oct. 11, 1983 [JP] Japan ............................ 58-189627

[51] Int. Cl.$^4$ ............................................. G02B 6/26
[52] U.S. Cl. ............................ 350/96.15; 350/96.10; 350/96.18; 362/32
[58] Field of Search ............... 350/96.10, 96.15, 96.18, 350/1.1, 1.6, 166; 362/32

[56] References Cited

U.S. PATENT DOCUMENTS

| | | | |
|---|---|---|---|
| 2,152,353 | 3/1939 | Lewin | 350/1.1 |
| 3,101,411 | 8/1963 | Richards | 350/1.1 |
| 3,455,622 | 7/1969 | Cooper | 350/1.1 |
| 4,012,149 | 3/1977 | Bouillie et al. | 350/96.15 X |
| 4,082,414 | 4/1978 | Berg | 350/1.7 |
| 4,389,085 | 6/1983 | Mori | 350/96.18 X |
| 4,420,796 | 12/1983 | Mori | 362/32 |
| 4,456,329 | 6/1984 | Henderson | 350/96.18 X |
| 4,471,412 | 9/1984 | Mori | 362/32 |
| 4,501,084 | 2/1985 | Mori | 43/17.5 |
| 4,519,670 | 5/1985 | Spinner et al. | 350/96.15 |
| 4,523,257 | 6/1985 | Mori | 362/32 |
| 4,540,237 | 9/1985 | Winzer | 350/96.15 |
| 4,555,864 | 12/1985 | Mori | 47/1.4 |

FOREIGN PATENT DOCUMENTS 0033128 3/1980 Japan ........................ 350/96.20

OTHER PUBLICATIONS

"Compact Wavelength Multiplexer Using Optical-Fiber Pieces" by Miyauchi et al., Jul. 1980.

*Primary Examiner*—William L. Sikes
*Assistant Examiner*—Akm E. Ullah
*Attorney, Agent, or Firm*—Jordan and Hamburg

[57] ABSTRACT

An artificial light source device in which the light rays from a light source lamp are converted to parallel light rays by means of a parabola reflection mirror and the parallel light rays are guided into an optical conductor rod; and furthermore, the output light rays from the optical rod are guided into an optical conductor cable, and the output light rays from the optical conductor cable are employed as the light source. The light-receiving edge of the optical conductor cable is inclined in relation to the direction of the light rays' propagation. In addition, a filtering film capable of letting a pre-selected light component pass through the light-receiving edge surface and of reflecting other pre-selected light components is provided thereon.

3 Claims, 3 Drawing Figures

ARTIFICIAL LIGHT SOURCE DEVICE

BACKGROUND OF THE INVENTION

The present invention relates, in general, to an artificial light source device, and in more detail, to one in which the light rays from a light source lamp are converted to parallel light rays by means of a parabola reflection mirror and the parallel light rays are guided into an optical conductor rod. Furthermore the light rays coming from the optical rod are then guided into the optical conductor cable and the light rays coming from the optical conductor cable are then employed as a light source. In such a device, the light-receiving edge of the optical conductor cable is inclined in relation to the direction of the light rays' propagation. In addition to that, a filtering film capable of letting a pre-selected part of the light pass through the light-receiving edge surface and of reflecting other pre-selected portions of the light thereon, is provided in this proposed device. In such a manner, a part of the light is separated from the rest by means of a filtering film.

In general, it is possible to illuminate any place through the use of an electric lamp. However, in the case of illuminating in an explosive atmosphere or in water, there necessarily exists a danger of explosion or electric leakage. For this reason, the electric instrument to be used in such places has to be of an explosion-proof type or a water-proof type. However, in the past, such an explosion-proof or water-proof instrument was heavy and expensive when completed, and it was also impossible to manufacture such completely explosion-proof or water-proof instruments as made possible by this new device.

Furthermore, the present applicant has previously proposed a light compound reaction device for nurturing chlorella or the like and an intensive cultivation device for cultivating plants in an atmosphere containing carbon dioxide (carbonic acid gas). In such devices, the light rays are necessary for creating a light compound reaction. In order to emit the necessary light rays for achieving its purpose, it needs to have a large number of small spotlight sources without emitting any heat and ultraviolet rays. In order to obtain the light source as mentioned above, the present applicant has previously proposed various methods and apparatuses in which solar rays are focused by a lens or the like and guided into an optical conductor cable consisting of a large number of optical fibers, and the solar rays are further guided through the optical conductor cable into the light compound reaction device of the chlorella nurturing device or the intensive plant cultivation device, and the light rays emitted from the optical fiber are employed as a spotlight source. In this regard, reference is made to U.S. Pat. No. 4,389,085 issued June 21, 1983; No. 4,420,796 issued Dec. 13, 1983; No. 4,471,412 issued Sept. 11, 1984; No. 4,523,257 issued June 11, 1985; No. 4,555,864 issued Dec. 3, 1985; and U.S. patent application Ser. No. 520,337 filed Aug. 4, 1983 U.S. Pat. No. 4,501,084.

However, if the light compound reaction device is effective even in the night time, only artificial light rays are employed instead of solar rays as the main light source. In such a case, the light rays from the artificial light source lamp are guided into the optical conductor cable and further guided through the optical conductor cable into the light compound reaction device. In such a device it is necessary to switch alternately the source of the solar rays and the source of the artificial light rays in order to employ them in an alternating way. On some occasions it is necessary to use the solar rays and the artificial light rays from both of the light ray sources at the very same time.

In an artificial light source device as described above, the light rays from an artificial light source lamp are converted to parallel light rays. The parallel light rays are guided into an optical conductor rod and are further guided through it into another optical conductor cable. When the light rays from the artificial light source lamp are guided through the optical conductor rod into the optical conductor cable in such a manner, the heat rays and the ultraviolet rays are among the light rays from the artificial light source, and the light rays or visible rays can be effectively guided into the optical conductor cable.

SUMMARY OF THE INVENTION

It is the primary object of the present invention to provide an artificial light source device which is an improvement over previous devices.

It is another object of the present invention to provide an artificial light source in which a pre-selected light component, for instance ultraviolet rays, is prevented from being guided into an optical conductor cable.

It is another object of the present invention to provide an artificial light source in which more high-quality light components, for instance visible rays, can be guided into an optical conductor cable.

It is another object of the present invention to provide an artificial light source device comprised of a light source lamp, a reflection mirror for reflecting light rays from the light source lamp in the form of parallel light rays, an optical conductor rod having a light-receiving edge surface placed opposed the reflection mirror, the parallel light rays being guided into an optical conductor rod and an optical conductor cable, a light-receiving edge surface of which is placed at the light-emitting edge surface of the optical conductor rod so as to be opposite the light-emitting edge surface thereof and which employs the light rays from the optical conductor cable as a light source, the light-receiving edge surface of the optical conductor cable being inclined in relation to the direction of the light rays' propagation, and a filter for letting only pre-selected light component pass through the inclined surface and for reflecting other pre-selected light components thereon is provided in the artificial light source device.

DESCRIPTION OF THE PREFERRED EMBODIMENTS

Figure 1:
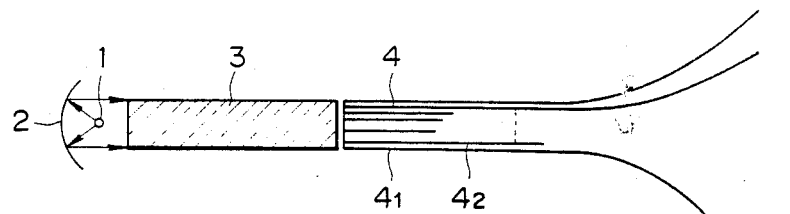
FIG. 1 is a cross-sectional view showing a prior art artificial light source device.

FIG. 1 is a cross-sectional view showing an embodiment of the artificial light source device previously proposed by the present applicant. In FIG. 1, 1 is an artificial light source lamp, 2 is a reflection mirror i.e. a parabola reflection mirror for converting light rays from the artificial light source lamp 1 to parallel light rays and for reflecting thereon. 3 is an optical conductor rod for receiving the parallel light rays from the reflection mirror 2, and 4 is an optical conductor cable consisting of a large number of optical fibers $4_1$, $4_2$, etc.

As shown in FIG. 1, the light rays from the artificial light source lamp 1 are converted to parallel light rays. The parallel light rays are initially guided into the optical conductor rod 3, and then further guided through the optical conductor rod 3 into the optical conductor cable 4. Furthermore, when the light rays from the artificial light source lamp 1 are guided through the optical conductor rod into the optical conductor cable in such a manner, the heat rays and the ultraviolet rays are among the light rays from the artificial light source, and the light rays can be effectively guided into the optical conductor cable.

However, in an artificial light source according to the present invention, pre-selected light components, for instance ultraviolet rays, are prevented from being guided into the optical conductor cable effectively and as a result more high-quality light components, for instance visible rays, can be guided into the optical conductor cable.

Figure 2:
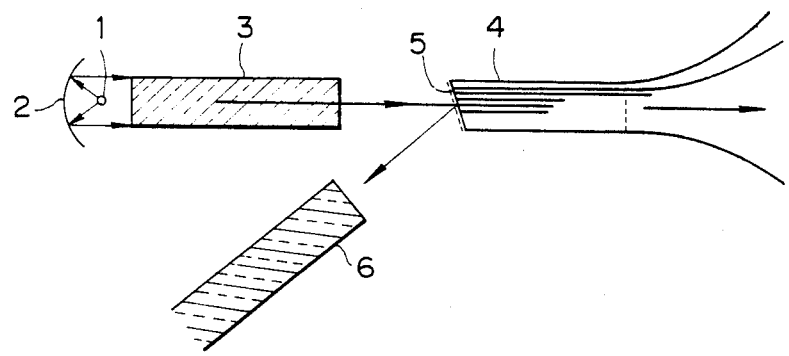
FIGS. 2 and 3 are cross-sectional views for explaining the construction of the first and second embodiments according to the present invention.

FIG. 2 is a cross-sectional view for explaining an embodiment of the present invention. In FIG. 2, the same reference numeral as FIG. 1 is attached to the part performing the same action as that of FIG. 1. In the present invention, the light-receiving edge of the optical conductor cable 4 is slightly inclined in relation to the direction of the propagation of the light rays and a filtering film, for instance a gold evaporation layer 5 capable of letting the visible rays pass through and of reflecting the ultraviolet rays thereon, is provided on the inclined surface. As a consequence, among the parallel light rays from the optical conductor rod 3, the ultraviolet rays and the infrared rays are reflected by the filtering film 5 and taken out therefrom, and only the visible rays are guided into the optical conductor cable 4.

As mentioned heretofore, according to the present invention, the light-receiving edge of the optical conductor cable 4 is established so as to be slightly inclined in relation to the direction of the light rays' propagation. If the light-receiving edge of the optical conductor cable 4 is not inclined at all, the ultraviolet rays reflected by the filtering film 5 are at this time inversely transmitted through the optical conductor rod 3 to the light source lamp side and are reflected thereon and propagated to the optical conductor cable side again. After the repetition of such a cycle, almost all of the ultraviolet rays and infrared rays are guided into the optical conductor cable. If the light-receiving edge surface of the optical conductor cable 4 is inclined in relation to the direction of the light rays' propagation, as shown in the present invention, the light rays reflected on the inclined surface do not propagate to the light source side.

Figure 3:
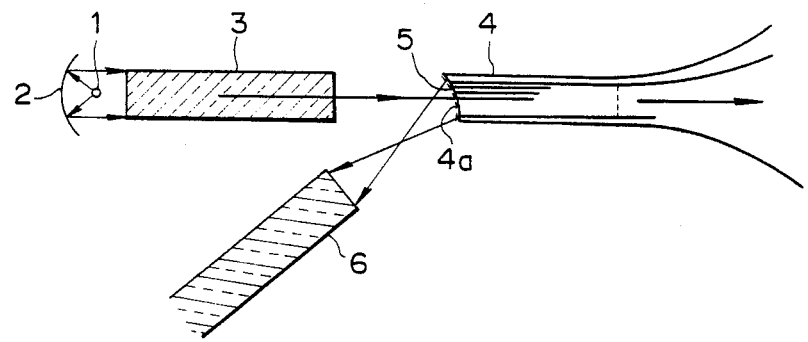

FIG. 3 is a cross-sectional view for explaining the construction of another embodiment according to the present invention. In that embodiment, the light-receiving edge 4a of the optical conductor cable 4 is shaped in a concave fashion. By using such a shape, the parallel light rays from the optical conductor rod 3 can not only be guided more effectively into the optical conductor 4, but also the reflected light rays are focused, so that they can be effectively guided into the optical conductor 6.

The ultraviolet rays taken out in such a manner as mentioned before may be allowed to dissipate. However, on some occasions, the ultraviolet rays may be guided into another optical conductor cable 6 for employing them in a desired way.

Moreover, an absorptive filter can be employed instead of a reflective filter. However, if the absorptive filter is employed, the light components absorbed are converted to heat and the property of matter is thereby thermally changed. Therefore, the absorptive filter may not be preferable for that reason.

An embodiment for separating the ultraviolet rays and the infrared rays from the artificial light source's light rays is described heretofore. However, the present invention is not limited to the afore-mentioned embodiment. For instance, in the case of nurturing, cultivating, and testing non-bacterial animals or plants, it is necessary to prohibit persons from entering the testing room. In such a case, according to the present invention, the light-emitting edge side of the optical conductor cable is guided into the non-bacterial room and the light source lamp can be put outside of it. Therefore, when the light source lamp is broken, persons need not enter the non-bacterial room, making it very convenient.

Furthermore, in such a case, the necessary light components and the unnecessary or harmful light components will differ depending on the kinds of animals or plants to be nurtured or cultivated there. On such an occasion, a suitable filter has to be selected in relation to the kinds of animals or plants. Furthermore, the light components from the light source lamp may be employed also in accordance with the kinds of animals or plants.

As is apparent from the foregoing description, according to the present invention, a specially designed light component, for instance, an ultraviolet ray component can be effectively separated from among the light rays coming from an artificial light source lamp, and the more high-quality light rays for instance visible rays, can be guided into the optical conductor cable.

What is claimed is:

1. An artificial light source device comprising a light source lamp, a reflection mirror for reflecting light rays from said light source lamp in the form of parallel light rays, an optical conductor rod having a first light-receiving end surface and a first light-emitting end surface, said first light-receiving end surface being disposed opposite said reflection mirror, said optical conductor rod having a longitudinal axis, said parallel light rays being guided into said optical conductor rod parallel to said longitudinal axis, an optical conductor cable having a concave light-receiving end surface disposed opposite to and spaced from said first light-emitting end surface of said optical conductor rod such that there is a first space between said concave light-receiving end surface and said first light-emitting end surface and the light rays pass from said first light-emitting end surface through said first space to said concave light-receiving end surface, filter means on said concave surface operable to pass only a pre-selected light component through the filter means to said optical conductor cable, said concave surface and said filter means reflecting and focusing other pre-selected light components in a direction which extends at an acute angle relative to the longitudinal axis of said optical conductor rod, and an optical conductor means having a longitudinal axis disposed at an acute angle relative to the longitudinal axis of said optical conductor rod, said optical conductor rod and said optical conductor means being spaced from one another, said optical conductor means having a second light-receiving end surface, said second light-receiving surface being disposed opposite to and spaced from said concave surface having said filter means thereon such that there is a second space between said second light-receiving end surface and said concave surface and said reflected and focused other preselected light components pass through said second space into said optical conductor means.

2. An artificial light source according to claim 1, wherein said filter means comprises a gold film which is evaporated onto said concave surface.

3. An artificial light source according to claim 1, wherein said filter means is disposed on the outside of said concave surface within said first and second spaces.

* * * * *